No. 672,189. Patented Apr. 16, 1901.
L. GRATHWOL.
DEVICE FOR MOISTENING LEAF TOBACCO.
(Application filed June 23, 1899.)

(No Model.) 2 Sheets—Sheet 1.

Witnesses:
G. H. Curtis
C. H. Curtis

Inventor:
Leopold Grathwol
By Mosher & Curtis
attys.

THE NORRIS PETERS CO., PHOTO-LITHO., WASHINGTON, D. C.

No. 672,189. Patented Apr. 16, 1901.
L. GRATHWOL.
DEVICE FOR MOISTENING LEAF TOBACCO.
(Application filed June 23, 1899.)

(No Model.) 2 Sheets—Sheet 2.

Witnesses:

Inventor:
Leopold Grathwol
By Mosher & Curtis
attys.

UNITED STATES PATENT OFFICE.

LEOPOLD GRATHWOL, OF TROY, NEW YORK.

DEVICE FOR MOISTENING LEAF-TOBACCO.

SPECIFICATION forming part of Letters Patent No. 672,189, dated April 16, 1901.

Application filed June 23, 1899. Serial No. 721,585. (No model.)

*To all whom it may concern:*

Be it known that I, LEOPOLD GRATHWOL, a citizen of the United States, residing at Troy, county of Rensselaer, and State of New York, have invented certain new and useful Improvements in Devices for Moistening Leaf-Tobacco, of which the following is a specification.

The invention relates to such improvements; and it consists of the novel construction and combination of parts hereinafter described and subsequently claimed.

Reference may be had to the accompanying drawings, and the characters of reference marked thereon, which form a part of this specification.

Similar characters refer to similar parts in the several figures.

Figure 1:
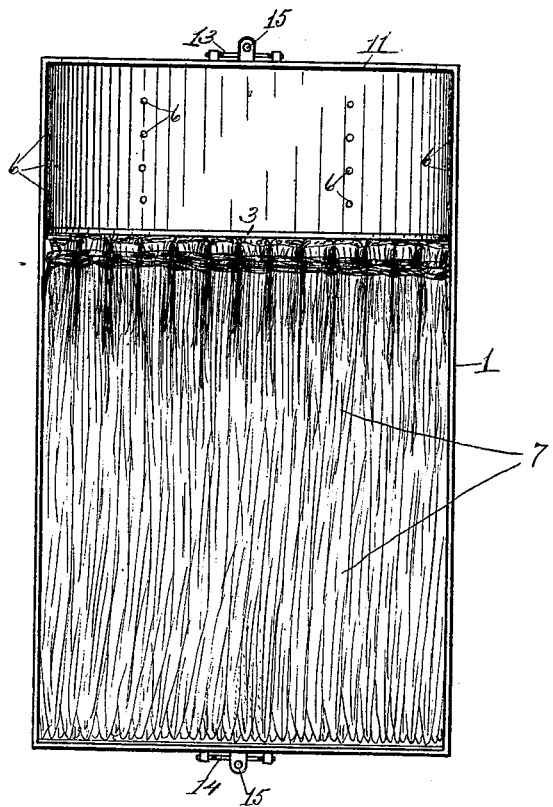
Figure 2:
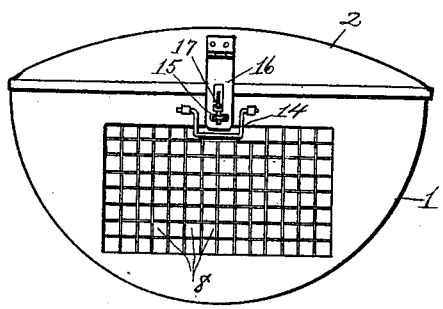
Figure 4:
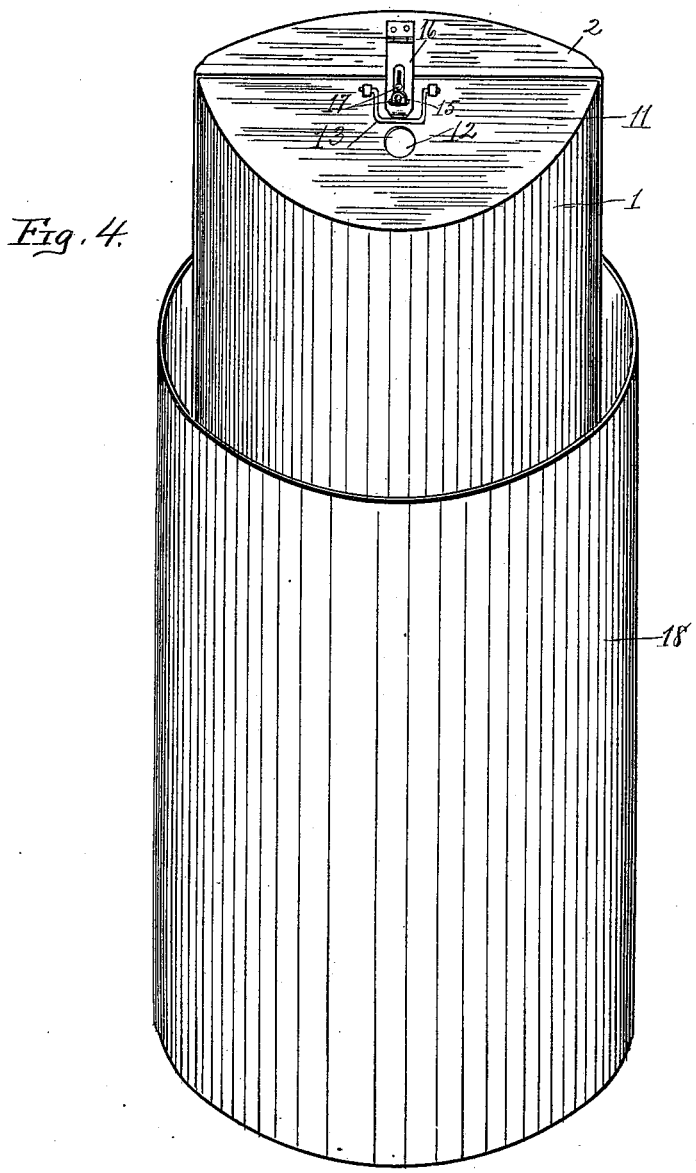
Figure 3:
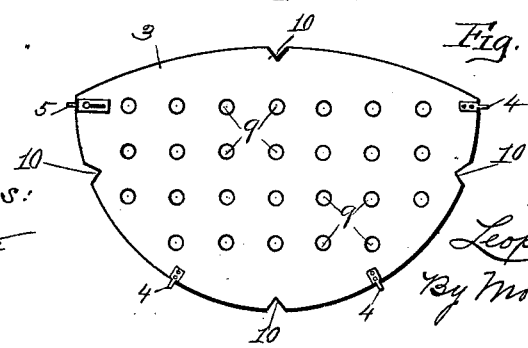

Figure 1 of the drawings is a top plan interior view of the larger case-section with the smaller section or cover removed and containing a plurality of tobacco-leaves. Fig. 2 is an exterior end elevation of the strainer end of the case-body closed by the superposed cover. Fig. 3 is a side elevation of the movable partition detached. Fig. 4 is a view in perspective of the case partly immersed in a water-tank.

It is well known that cigars are manfactured from tobacco which has been cured and dried in leaf form and that dried leaf-tobacco is very brittle and easily broken when dry, that the leaves must be thoroughly moistened and made pliable before they can be successfully used in the manufacture of cigars, and that broken leaves are useless for "wrappers" and less valuable than unbroken leaves. I have discovered that a large number of dried leaves may be secured together in a bundle with the leaves approximately parallel with each other and the tips pointing in the same direction and the whole bundle moistened almost as quickly as a single leaf or a small hand of stripped leaves by first forcing the bundle downwardly, tips first, into water. The water forces its way up between the leaves, driving the imprisoned air before it along the leaves until it is expelled at or near the leaf-butts, whereas if a hand or bundle of dried leaves were immersed in water by forcing it into the water, side first, the air contained between the leaves would not be forced out, but would remain imprisoned between the leaves, thereby preventing the water or other moistening fluid from coming in contact with that part of the leaf or leaves, with the result that a comparatively small portion of the leaves would receive any moisture, whereas by inserting the leaves tips first the operation is quickly performed and the moisture is distributed throughout the individual leaves with great uniformity. After the bundle of leaves has been immersed long enough to expel most of the air it is withdrawn and preferably supported in a vertical position with the tips up and the butts down, so that any surplus of water will gravitate along the leaves and run off the butts. When desired, the bundle may be separated into smaller parcels after immersion and before being subjected to the gravity-drainage. By thus bundling together a considerable number of the dried leaves only the few outside leaves are exposed to injury by contact with other objects during the moistening operation and much time is saved in carrying out the operation.

By casing the bundle in a containing vessel or shield with inlets at the lower end for the admission of water or other moistening fluid and with outlets for the escape of the expelled air at the upper end I am able to also protect the outer as well as the inner leaves of the bundle, and thereby prevent the injury of any except the very small percentage which may be injured in bundling or packing the leaves in the inclosing case or shield.

Referring to the drawings, 1 is the larger section of the inclosing case or shield, and 2 is the smaller section or cover. The larger section is provided with a movable partition 3, arranged transversely of the case. This partition is provided with means for securing it in differing positions, as the spurs 4 and spring-controlled slide-bolt 5, respectively, adapted to enter the apertures 6 in the case-section and secure the partition in the desired position. To remove the partition from the position shown in Fig. 1 to another position nearer one of the ends of the case, it is only necessary to spring back slide-bolt 5 until it is withdrawn from its inclosing aperture 6 to enable the operator to lift the partition out from the case, the spurs 4 being easily withdrawn from their inclosing apertures 6. To reinsert the partition in an adjusted position nearer one of the ends of the case, it is only necessary to force back the slide-bolt, then enter the spurs 4 in apertures 6 of the desired series of apertures, and force the slide-bolt into its corresponding aperture 6 in the same series of apertures. It may be seen in Fig. 1 that the apertures 6 are arranged in successive series, each series being in a plane extending transversely of the case. The partition being adapted to be secured in and removed from each of these series of apertures can thereby be adjustably secured in differing positions in the case, so as to increase or diminish the length of the chamber adapted to receive the bundles of tobacco-leaves. The partition is thus placed and secured in position to adapt the available length of the case-section to the length of tobacco-leaves to be moistened.

The leaves 7 are shown in the section between the partition and that end of the section which is provided with inlet-apertures 8, which may be such as are contained in a common wire strainer. The butts of the leaves abut upon the partition, and all the tips are adjacent to the apertured end of the section. The movable partition is also provided with one or more air-outlets, which may be apertures 9 in the body of the partition or notches 10 in its periphery or any irregular shape which will afford an air-space between the partition and case-wall, through which the air can escape from the tobacco-inclosure of the section.

The outer end wall 11 of the case-section may be partly cut away or provided with an opening 12 to allow the escaping air to pass out of the case.

The ends of the case may each be provided with handles 13 and 14 for convenience in manipulation.

As a means for fastening the two case-sections together I have shown one section at each end provided with a staple 15 and the other section with a coöperating hasp 16 and pin-bolt 17 on the hasp to enter the staple after the slotted and hinged hasp has been slipped onto the staple in the well-known manner of hasp-locks.

The leaves are preferably of the proper length to approximately reach from the inlet end wall of the case to the movable partition, so that all the leaves will be acted upon uniformly and not be displaced when immersed in or removed from the moistening fluid.

Without the adjustable or movable partition the shorter leaves would not reach the whole length of the inclosure and the bundle might slide up and down in the case-inclosure as the case was forced into and withdrawn from the water, thus breaking the tips of the longer leaves.

The partition can be adjusted, as before explained, to accommodate the length of the tobacco-inclosure to the different lengths of the leaves, the respective bundles being made up of leaves of approximately the same length.

After a sufficient number of leaves to approximately fill the tobacco-inclosure have been packed in the case and the case-sections secured together, as shown in Fig. 2, the case is forced downwardly, inlet end first, into the tank 18, containing water or other moistening fluid, as shown in Fig. 4, until the air is mostly expelled from between the leaves by the entrance of the moistening fluid, after which the case is withdrawn from the tank, opened, and the wet leaves removed and supported in a vertical position, butts downward, until the moistening is completed.

When desired, the case may be supported for a brief interval after removal from the tank in a vertical position and inverted, so that the inlet end is uppermost and the fluid allowed to gravitate to the butts of the leaves before the leaves are removed from the case.

What I claim as new, and desire to secure by Letters Patent, is—

1. A case for moistening dried tobacco-leaves consisting of an inclosing shell having small fluid-inlets at one end and air-outlet at the other end, means for opening and closing the shell, and an adjustable partition, whereby the length of the tobacco-inclosure can be varied to accommodate different lengths of leaves, substantially as described.

2. A case for moistening dried tobacco-leaves consisting of a leaf-inclosure having a fluid-inlet at one end and air-outlet at the opposite end, and means for opening and closing the case.

In testimony whereof I have hereunto set my hand this 19th day of June, 1899.

LEOPOLD GRATHWOL.

Witnesses:
 GEO. A. MOSHER,
 FRANK C. CURTIS.